United States Patent
Osuki

(10) Patent No.: US 9,442,682 B2
(45) Date of Patent: Sep. 13, 2016

(54) IMAGE PROCESSING APPARATUS, CONTROL METHOD THEREFOR AND STORAGE MEDIUM

(71) Applicant: CANON KABUSHIKI KAISHA, Tokyo (JP)

(72) Inventor: Takashi Osuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/317,549

(22) Filed: Jun. 27, 2014

(65) Prior Publication Data
US 2015/0009529 A1    Jan. 8, 2015

(30) Foreign Application Priority Data

Jul. 8, 2013 (JP) ................ 2013-143094

(51) Int. Cl.
G06F 3/12 (2006.01)
H04N 1/00 (2006.01)

(52) U.S. Cl.
CPC .......... *G06F 3/1222* (2013.01); *G06F 3/1238* (2013.01); *G06F 3/1285* (2013.01); *H04N 1/00127* (2013.01); *G06F 3/1292* (2013.01)

(58) Field of Classification Search
None
See application file for complete search history.

(56) References Cited

U.S. PATENT DOCUMENTS

| 6,064,839 | A * | 5/2000 | Nakamura | G03G 15/50 399/18 |
| 6,453,268 | B1 * | 9/2002 | Carney | G06F 3/121 702/186 |
| 6,487,521 | B1 * | 11/2002 | Carney | G06F 3/1204 702/116 |
| 7,120,910 | B2 | 10/2006 | Matsuda et al. | |
| 8,065,384 | B2 * | 11/2011 | Plewnia | G06F 21/41 709/217 |
| 8,379,258 | B2 * | 2/2013 | Uchida | G06F 21/00 358/1.15 |
| 8,610,912 | B2 * | 12/2013 | Hirose | G06K 15/1859 358/1.13 |
| 8,780,377 | B2 * | 7/2014 | Nishida | G06F 3/1222 358/1.14 |
| 2001/0029521 | A1 * | 10/2001 | Matsuda | G06F 17/30893 709/201 |
| 2004/0184064 | A1 * | 9/2004 | TaKeda | G06F 21/608 358/1.13 |
| 2006/0064742 | A1 * | 3/2006 | Takahashi | H04L 63/083 726/4 |
| 2006/0101279 | A1 * | 5/2006 | Akita | G06F 21/608 713/184 |
| 2008/0028438 | A1 * | 1/2008 | Sakakibara | G06F 21/608 726/2 |
| 2008/0259394 | A1 * | 10/2008 | Yamada | G06F 3/1214 358/1.15 |
| 2009/0033990 | A1 * | 2/2009 | Matsugashita | G06F 21/608 358/1.15 |

(Continued)

FOREIGN PATENT DOCUMENTS

JP 2000-92262 A 3/2000
JP 2002-7095 A 1/2002

*Primary Examiner* — Ted Barnes
(74) *Attorney, Agent, or Firm* — Fitzpatrick, Cella, Harper & Scinto

(57) ABSTRACT

An image processing apparatus accepts a request from a computer over a network, processes an image processing job in response to the request, generates identification information corresponding to the image processing job, transmits to the computer a response on which the identification is set, and controls the image processing job when the receiving unit has accepted a second request on which the identification information is set.

10 Claims, 6 Drawing Sheets

(56) References Cited

U.S. PATENT DOCUMENTS

| | | | |
|---|---|---|---|
| 2009/0097064 A1* | 4/2009 | Tominaga | H04N 1/00917 358/1.15 |
| 2009/0207434 A1* | 8/2009 | Tanaka | H04N 1/00854 358/1.14 |
| 2010/0088375 A1* | 4/2010 | Hirose | G06F 9/5027 709/204 |
| 2010/0115268 A1* | 5/2010 | Kudo | H04L 63/0815 713/156 |
| 2010/0149570 A1* | 6/2010 | Kamiya | G06F 21/10 358/1.13 |
| 2010/0302579 A1* | 12/2010 | Nuggehalli | G06F 3/1203 358/1.15 |
| 2011/0119333 A1* | 5/2011 | Tamura | H04N 1/00222 709/203 |
| 2011/0246602 A1* | 10/2011 | Mihara | H04L 29/0809 709/217 |
| 2011/0279845 A1* | 11/2011 | Sako | H04N 1/00222 358/1.13 |
| 2012/0002221 A1* | 1/2012 | Zhan | G06F 3/1204 358/1.9 |
| 2012/0050783 A1* | 3/2012 | Osuki | G06F 3/1204 358/1.14 |
| 2012/0133965 A1* | 5/2012 | Osuki | H04N 1/00244 358/1.13 |
| 2012/0133968 A1* | 5/2012 | Hirose | G06K 15/1859 358/1.13 |
| 2012/0268768 A1* | 10/2012 | Nakashima | G06F 21/608 358/1.13 |
| 2013/0321849 A1* | 12/2013 | Masui | G06K 15/1809 358/1.14 |
| 2014/0104624 A1* | 4/2014 | Yamaguchi | G06K 15/005 358/1.2 |
| 2014/0160504 A1* | 6/2014 | Nakashima | H04N 1/00408 358/1.13 |
| 2014/0240736 A1* | 8/2014 | Tsongas | H04N 1/00896 358/1.13 |
| 2014/0293315 A1* | 10/2014 | Takarabe | H04N 1/32122 358/1.14 |
| 2014/0315620 A1* | 10/2014 | Wells | G07F 9/026 463/20 |

* cited by examiner

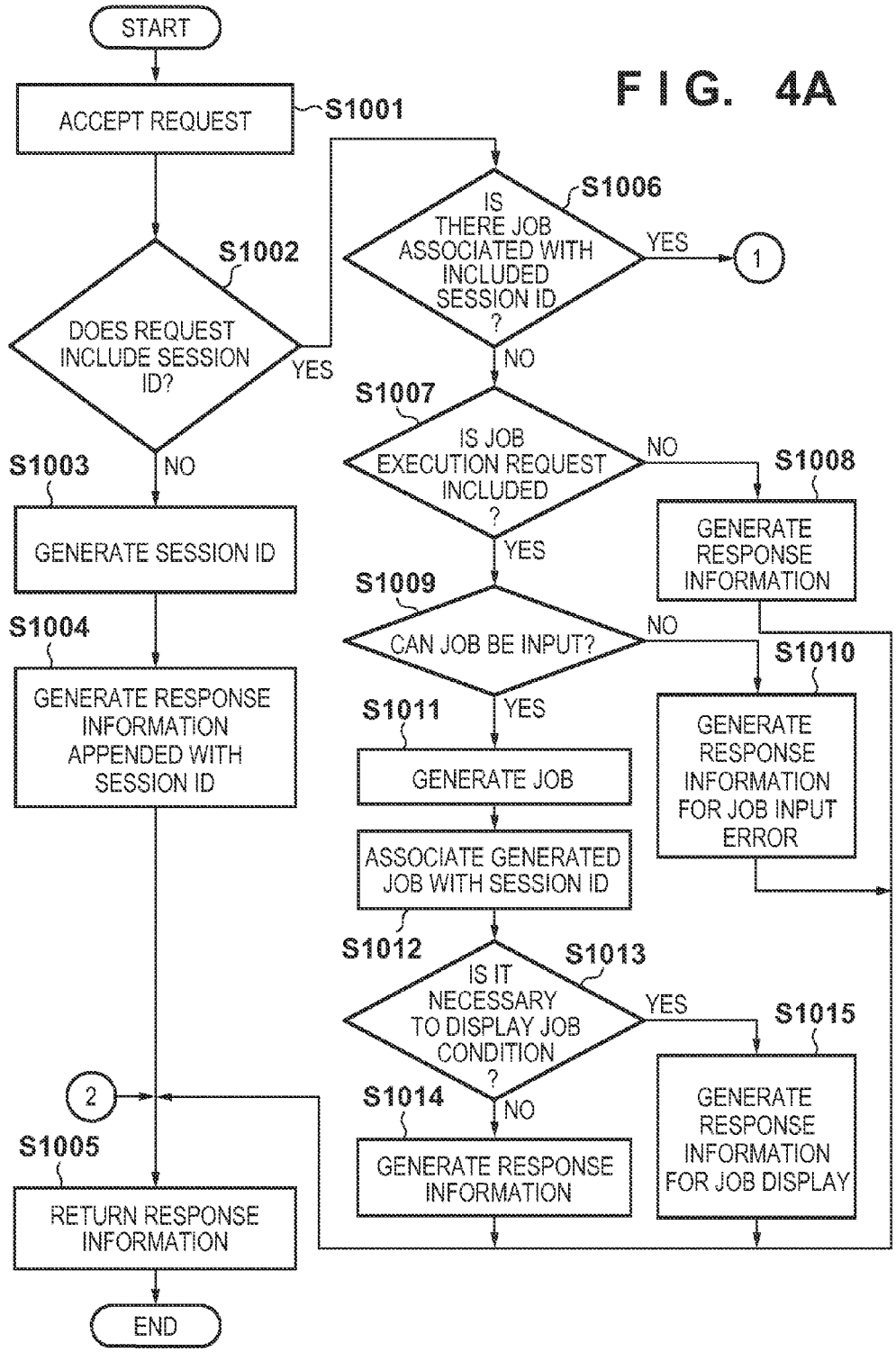

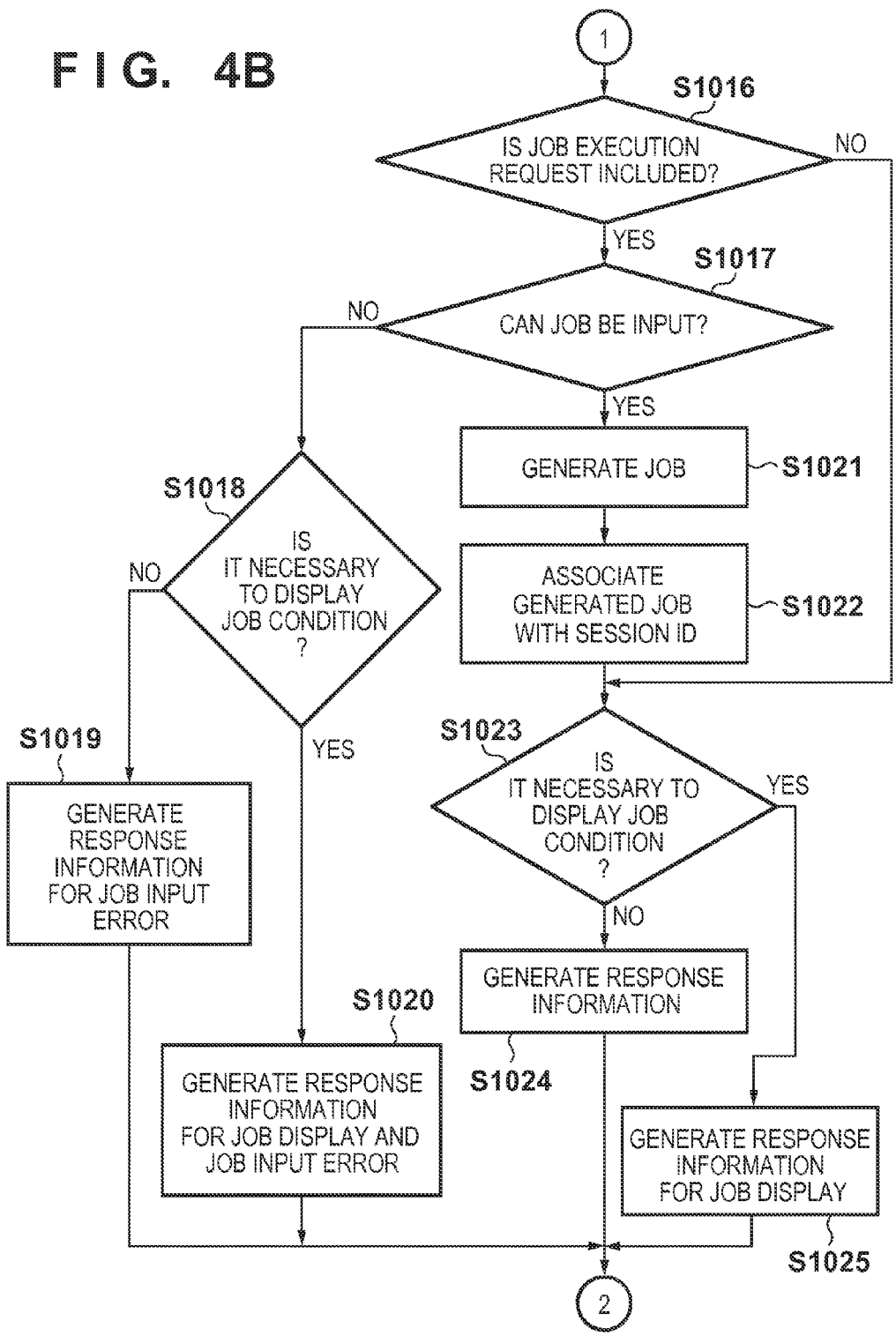

IMAGE PROCESSING APPARATUS, CONTROL METHOD THEREFOR AND STORAGE MEDIUM

BACKGROUND OF THE INVENTION

1. Field of the Invention

The present invention relates to an image processing apparatus with web server functions, a control method therefor, and a storage medium.

2. Description of the Related Art

With the dissemination of the Internet, PCs with web browser functions are generally widespread. Accordingly, many network devices, such as printers, copiers, facsimile machines and routers, have web server functions. As disclosed in Japanese Patent Laid-Open No. 2000-92262 and Japanese Patent Laid-Open No. 2002-7095, a user can obtain information of these network devices and configure settings therefor by accessing these network devices using a browser installed on a PC and operating a displayed web page, without installing special applications. Furthermore, instructions for a copy job and a print job can also be issued remotely via the browser using such web server functions.

However, the aforementioned conventional techniques have the following problems. For example, with the aforementioned conventional techniques, in the case where a user has issued an instruction for a print job from a browser, it is not possible to identify from which browser the job has been input. Therefore, a device that does not have user management functions cannot recognize which job has been executed through which user instruction, and thus cannot appropriately manage jobs and display of browsers viewed by users.

For example, in the case of an email transmission function for scanned images that requires a user to issue a scan instruction to a device multiple times during one job, another user may cancel the job while the original user is issuing the scan instruction from a browser. This could possibly occur when another user configures settings using an operation unit of the device or another browser. In this case, if another user further issues an instruction for another job, the job being displayed on the browser viewed by the original user differs from the job being processed by the device. However, even if such a contradiction has occurred, conventional techniques allow the original user to operate, from the browser, the job of another user currently being processed by the device, thereby yielding a job result that does not conform with the intention of another user.

One possible way to prevent the foregoing situation is to inhibit job control from another browser and the operation unit of the device during operation of a job via one browser. In this case, however, the inhibition of job control by another user cannot be lifted until a job instruction source performs a cancel operation or an input completion operation. That is to say, for example, in the case where a user who issued a job instruction has closed a browser during operation, another user cannot perform job operations on the device until a timeout mechanism and the like function.

SUMMARY OF THE INVENTION

The present invention enables realization of a mechanism for accepting instructions related to jobs from a plurality of browsers, and for preventing a predetermined browser from operating jobs other than an operation target by favorably managing jobs and controlling screens of the browsers.

One aspect of the present invention provides an image processing apparatus comprising: an accepting unit configured to accept a request from a computer over a network; a processing unit configured to process an image processing job in response to the request; a generating unit configured to generate identification information corresponding to the image processing job; a transmitting unit configured to transmit to the computer a response on which the identification is set; and a control unit configured to control the image processing job when the receiving unit has accepted a second request on which the identification information is set.

Another aspect of the present invention provides a method of an image processing apparatus, the method comprising: accepting a request from a computer over a network; processing an image processing job in response to the request; generating identification information corresponding to the image processing job; transmitting to the computer a response on which the identification is set; and controlling the image processing job upon reception of a second request on which the identification information is set.

Further features of the present invention will be apparent from the following description of exemplary embodiments with reference to the attached drawings.

BRIEF DESCRIPTION OF THE DRAWINGS

FIGS. 4A and 4B are flowcharts for generating an http response according to one embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Network Configuration>

Figure 1:
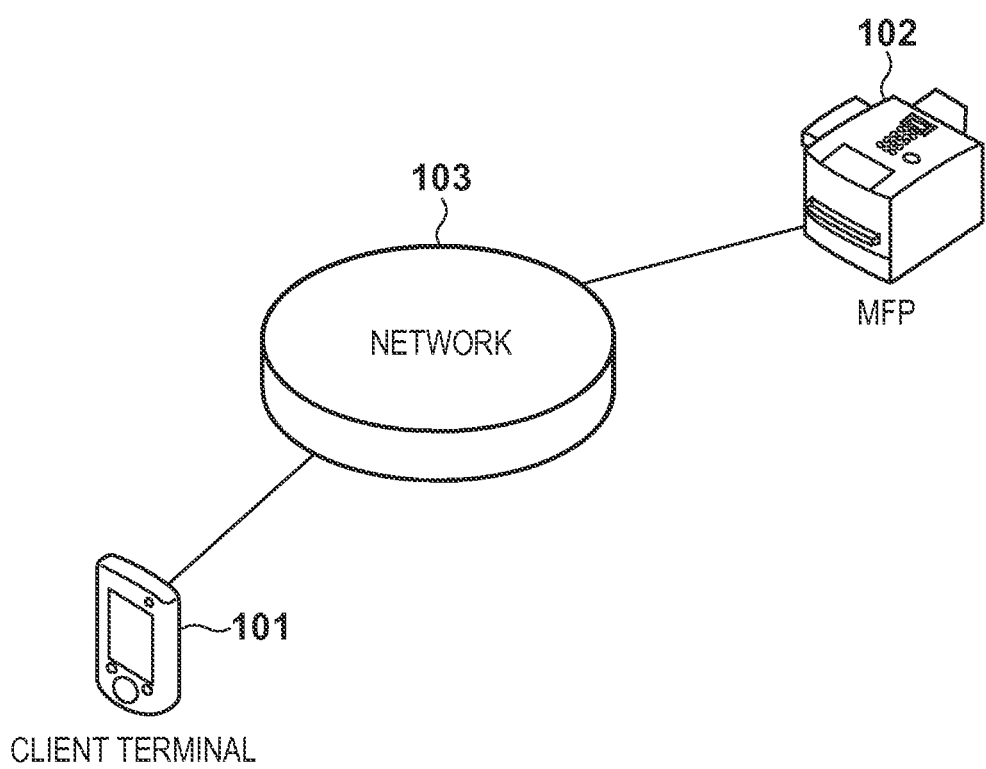
FIG. 1 shows a network configuration according to one embodiment.

The following describes one embodiment of the present invention with reference to FIGS. 1 to 5. FIG. 1 shows an example of arrangement of an MFP 102, which is one example of an image processing apparatus according to the present embodiment, and a client terminal 101 (information terminal apparatus) connected to the MFP 102 via a network 103.

While the MFP 102 is a network multi-functional peripheral with web server functions, it is not limited to having configurations described herein as long as it is a job processing apparatus that processes a sequence of jobs through user operations on a printer, a copier, a facsimile machine, and the like, and has web server functions. The client terminal 101 is a computer for accessing the MFP 102. The client terminal 101 can communicate with the MFP 102 via the network 103 and use services provided by the MFP 102 using a browser. The client terminal 101 can input a job to the MFP 102 and issue an instruction related to settings for the job thereto via the browser. The MFP 102 and the client terminal 101 are connected via the network 103, such as LAN (local area network), WAN (wide area network), and the Internet.

<Hardware Configuration of Image Processing Apparatus>

Figure 2:
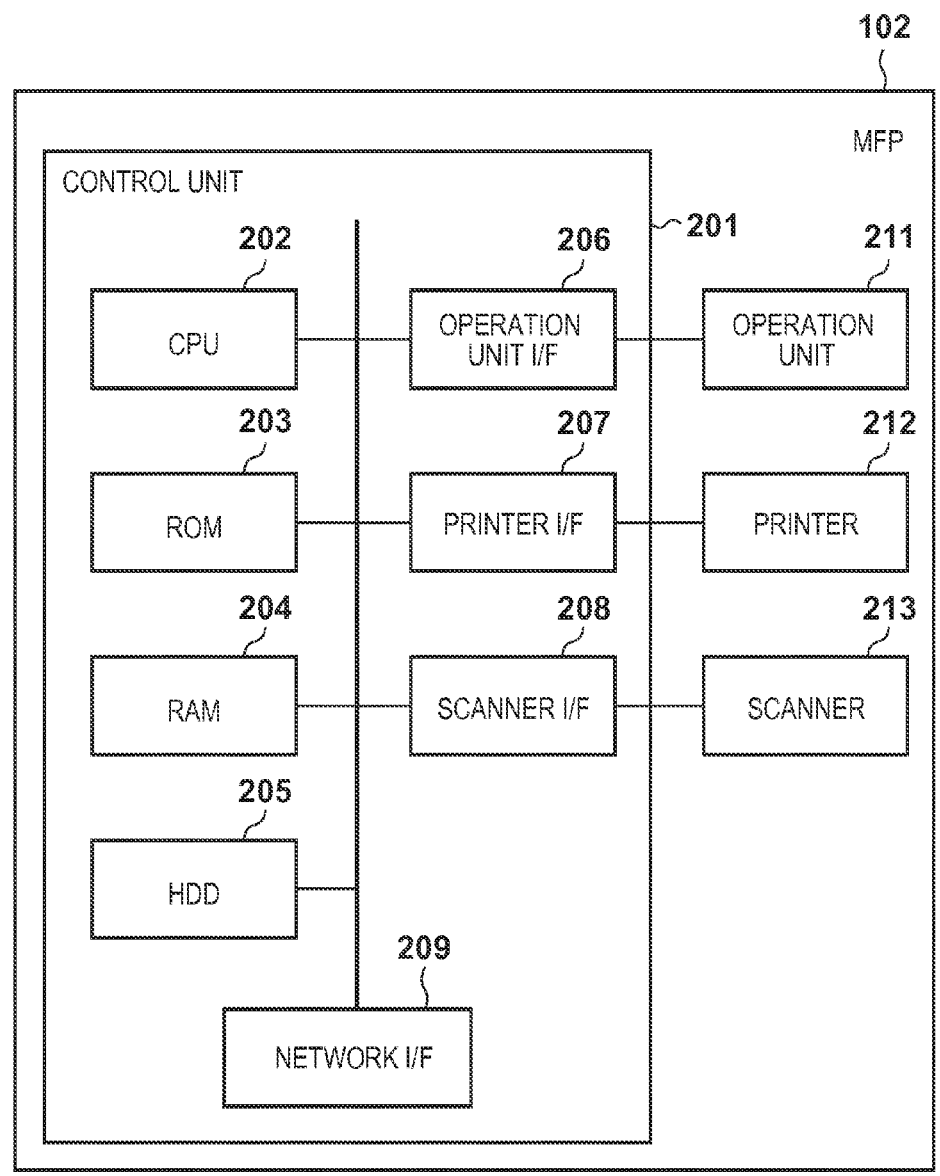
FIG. 2 shows one example of a hardware configuration of an MFP 102 according to one embodiment.

A description is now given of an example of a hardware configuration of the MFP 102, which is one example of the image processing apparatus according to the present embodiment, with reference to FIG. 2. The MFP 102 includes a control unit 201, an operation unit 211, a printer 212, and a scanner 213. The control unit 201 includes a CPU 202, a ROM 203, a RAM 204, an HDD 205, an operation unit I/F 206, a printer I/F 207, and a scanner I/F 208.

The control unit 201 performs overall control of the MFP 102. The CPU 202 reads control programs stored in the ROM 203 and executes various types of control processing. The RAM 204 is used as a main memory and a temporary storage area, such as a working area, for the CPU 202. The HDD 205 stores image data, various programs, and various information tables.

The printer I/F 207 connects the printer 212 and the control unit 201. Image data to be printed by the printer 212 is transferred from the control unit 201 to the printer 212 via the printer I/F 207, and printed on a recording medium by the printer 212. The scanner I/F 208 connects the scanner 213 and the control unit 201. The scanner 213 generates image data by reading an image of an original, and passes the image data to the control unit 201 via the scanner I/F 208.

The operation unit I/F 206 connects the operation unit 211 and the control unit 201. The operation unit 211 includes a display unit (e.g., a liquid crystal display unit with touch-screen functions) and a keyboard. A network I/F 209 is a control unit that exchanges various types of information with a web server and the like in the LAN. When the power of the above-configured MFP 102 is turned on, the CPU 202 first initializes the apparatus and loads an OS in the HDD 205 and the like in accordance with a boot program in the ROM 203, and then actuates various applications and the like.

<Software Configuration of Image Processing Apparatus>

Figure 3:
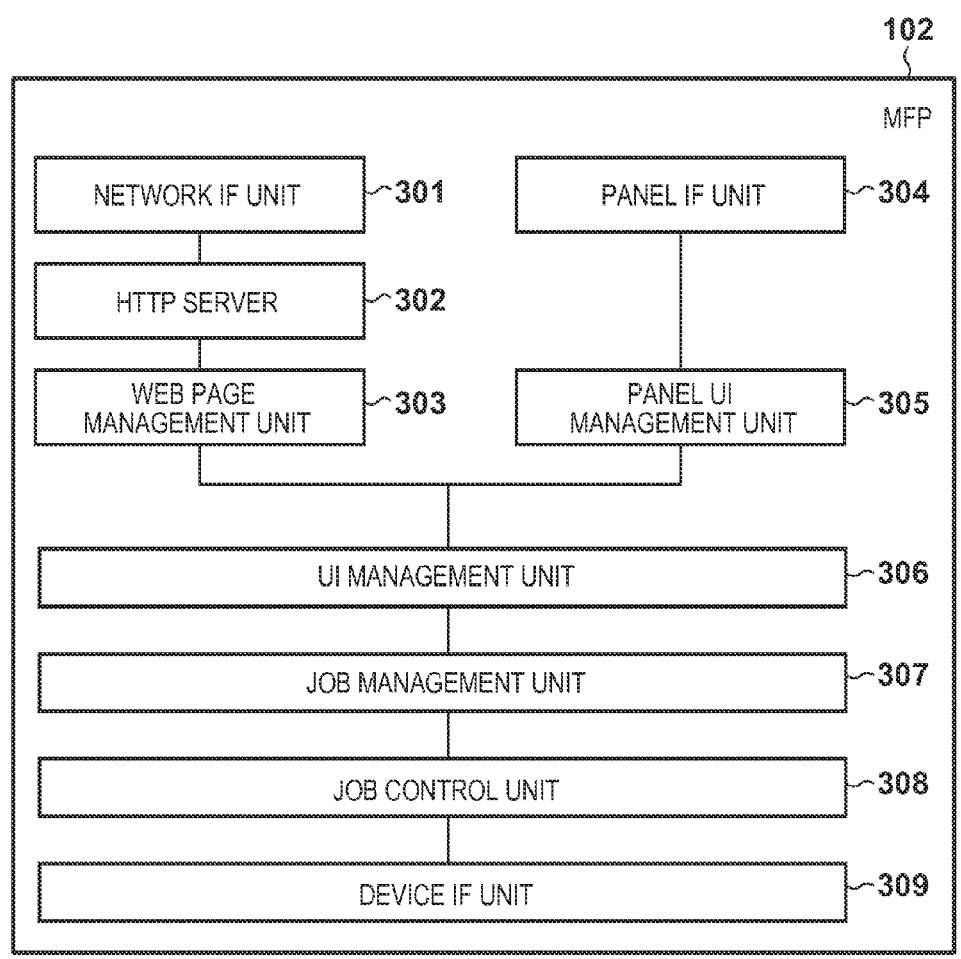
FIG. 3 shows one example of a software configuration of an MFP 102 according to one embodiment.

Next, a description is given of an example of a software configuration of the MFP 102 according to the present embodiment with reference to FIG. 3. It should be noted that the software configuration described below may be realized as a hardware configuration, or as a combination of software and hardware.

A network I/F unit 301 interprets information received by the network I/F 209, and assigns the information to modules in accordance with protocols. Also, when it receives a request for transmission of information from the modules, it transmits the information to the outside via the network I/F 209 in a predetermined format.

An http server unit 302 interprets information received from the network I/F unit 301, and if the content of the information relates to web page control, notifies a web page management unit 303 of necessary information in a predetermined format. Also, when the http server unit 302 has received a request for transmission of information from the web page management unit 303, it notifies the network I/F unit 301 of received information in an http format.

The web page management unit 303 generates screen information in an HTML format in accordance with the content of a notification received from the http server unit 302, and makes a request for notification of information to the http server unit 302 as return information. At this time, information from a UI management unit 306 and the generated screen information are changed. The web page management unit 303 notifies the UI management unit 306 of information received from the http server unit 302 as necessary.

A panel I/F unit 304 controls the operation unit 211 via the operation unit I/F 206 in response to an instruction from a panel UI management unit 305. It also notifies the panel UI management unit 305 of information from the operation unit I/F 206. Based on information from the UI management unit 306, the panel UI management unit 305 notifies the operation unit 211 of various types of display and lamp/speaker control information.

The UI management unit 306 manages information that is mutually used by the web page management unit 303 and the panel UI management unit 305 in accordance with job information obtained from a job management unit 307 and device conditions. It also changes device conditions and requests the job management unit 307 to generate and delete jobs in response to notifications from the web page management unit 303 and the panel UI management unit 305. The job management unit 307 manages generation, deletion and conditions of jobs, notifies other modules of job conditions, and instructs a job control unit 308 to, for example, start, pause and cancel jobs.

In response to an instruction from the job management unit 307, the job control unit 308 controls devices such as the printer and the scanner via a device I/F unit 309, depending on the necessity to execute processing corresponding to each type of job. The device I/F unit 309 is a module for controlling the scanner I/F 208 and the printer I/F 207 shown in FIG. 2.

It suffices for the client terminal 101 to be equipped with software that has ordinary web browsing functions, and a description thereof is omitted as it belongs to an ordinary technique. The client terminal 101 may be a mobile terminal or a fixed terminal.

<Processing Procedure>

With reference to FIGS. 4A and 4B, the following describes operations of the MFP 102 for the case where a web page provided by the MFP 102 is operated from a browser of the client terminal 101. The processing described below is realized by the CPU 202 reading a control program stored in the ROM 203 and the HDD 205 into the RAM 204 and executing the read control program. Specifically, below is a description of control that serves as a measure against the following case: while a user is configuring, via the browser, settings for a job that he/she has input from the client terminal 101, another user cancels the job via another browser and the operation unit 211 and inputs a new job. In this case, conventional techniques give rise to the possibility that, when the original user completes the job settings and issues an instruction, the new job input by another user reflects the settings, thereby yielding a result that does not conform with the intention of another user.

When the client terminal 101 operates a web page provided by the MFP 102 using the browser, an http request is transmitted from the client terminal 101 to the MFP 102. In step S1001, the CPU 202 accepts the http request and interprets the content of the request. In step S1002, the CPU 202 determines whether or not the accepted request includes a session ID, which is identification information. If the request includes the session ID, whether or not the session ID is valid is further determined, and if the session ID is valid, valid period information of the session ID is updated and processing proceeds to step S1006. If the session ID is invalid, the CPU 202 generates response information that serves as a notification to the effect that the session ID is invalid, and returns (responds with) an http response.

When the browser receives a session ID, the browser transmits a request appended with the session ID in the case of a request to a transmission source of the session ID. In general, a session ID becomes invalid after a certain time period. Furthermore, in general, a session ID is stored in a cookie and web storage that can be used as storage areas for the browser. In the present invention, a session ID may be retained using any information management method that can be used by the browser and can be appended to a request, and the present invention is not limited in this regard.

If the request does not include the session ID, the CPU 202 generates a session ID in step S1003, and generates http response information appended with requested page information and the session ID in step S1004. Subsequently, the CPU 202 returns the generated http response information to the client terminal 101, which is a transmission source of the request, in step S1005, and then ends processing.

On the other hand, in step S1006, the CPU 202 determines whether or not there is a job associated with the session ID included in the request. If there is a job associated with the session ID included in the request, processing proceeds to step S1016. If there is no job associated with the session ID included in the request, processing proceeds to step S1007.

In step S1007, the CPU 202 determines whether or not the request includes a job execution request. If the request does not include the job execution request, the CPU 202 proceeds to step S1008 and generates http response information including requested page information. Subsequently, the CPU 202 returns the generated http response information to the client terminal 101, which is the transmission source of the request, in step S1005, and then ends processing. That is to say, in the present case, it is determined that the request is not for job execution but is simply for page information, and corresponding page information is returned to the client terminal 101.

If the request is determined to include the job execution request in step S1007, the CPU 202 proceeds to step S1009 and determines whether or not a job can be input to the MFP 102, i.e., the image processing apparatus. This determination is made based on, for example, whether or not information of the job execution request is appropriate with no presence of insufficient/contradicting information, whether or not a job that is to be input through another execution job is in an inexecutable condition, and whether or not various devices such as the scanner and the printer are in a usable condition. That is to say, in the present case, it is determined whether or not the MFP 102 is in a condition to normally process a job if the job is newly input.

If a job cannot be input, the CPU 202 generates http response information for displaying job input error on the browser (error information) in step S1010, and returns the generated http response information to the client terminal 101, which is the transmission source of the request. On the other hand, if it is determined that a job can be input in step S1009, the CPU 202 generates job information in step S1011, and associates the generated job information with information of the session ID included in the request in step S1012. Thereafter, in step S1013, the CPU 202 determines whether or not it is necessary to display the condition or an operation screen of the job associated with the session ID. This determination is made in accordance with the type and the progress status of the job. Processing proceeds to step S1015 if it is determined that the display is necessary, and to step S1014 if it is determined that the display is not necessary.

The CPU 202 generates http response information including page information requested by the request in step S1014, returns the generated http response information to the client terminal 101, which is the transmission source of the request, in the following step S1005, and then ends processing. On the other hand, if it is necessary to display the job condition or the job operation screen associated with the session ID, the CPU 202 generates http response information including the job condition or the job operation screen (display information) in step S1015. Subsequently, the CPU 202 proceeds to step S1005, returns the generated http response information to the client terminal 101, which is the transmission source of the request, and then ends processing.

If it is determined in step S1006 that there is a job associated with the included session ID, the CPU 202 determines whether or not the request includes a job execution request in step S1016. Processing proceeds to step S1017 if the request includes the job execution request, and to step S1023 if the request does not include the job execution request. In step S1017, the CPU 202 determines whether or not a job can be input. This determination is made based on, for example, whether or not information of the job execution request is appropriate with no presence of insufficient/contradicting information, whether or not a job that is to be input through another execution job is in an inexecutable condition, and whether or not various devices such as the scanner and the printer are in a usable condition. That is to say, in the present case, it is determined whether or not the MFP 102 is in a condition to normally process a job if the job is newly input.

If a job cannot be input, the CPU 202 proceeds to step S1018 and determines whether or not it is necessary to display the job condition or the job operation screen associated with the session ID. This determination is made in accordance with the type and the progress status of the job. Processing proceeds to step S1020 if it is determined that the display is necessary, and to step S1019 if it is determined that the display is not necessary.

The CPU 202 generates http response information for displaying job input error on the browser (error information) in step S1019, returns the generated http response information to the client terminal 101, which is the transmission source of the request, in step S1005, and then ends processing. On the other hand, in step S1020, the CPU 202 generates http response information including the job condition or the job operation screen, as well as information for displaying, on the browser, job input error with respect to a job input request included in the request (error information). Subsequently, the CPU 202 returns the http response information to the client terminal 101, which is the transmission source of the request, in step S1005, and then ends processing.

If it is determined that a job can be input in step S1017, the CPU 202 generates job information in step S1021, and associates the generated job information with information of the session ID included in the request in step S1022. In the present case, as a similar job appended with the session ID already exists (step S1006), it is assumed that the generated job is a job that aims to add further operations to the existing job, instead of a new job that does not have any relationship with the existing job. Therefore, in the aforementioned step S1021, control may be performed to add information to the generated job as an operation for the existing job, instead of simply generating a job. One example of such a job that requires an additional operation is an email transmission function for scanned images that requires a user to issue a scan instruction to a device multiple times during one job.

Thereafter, in step S1023, the CPU 202 determines whether or not it is necessary to display the job condition or the job operation screen associated with the session ID. This determination is made in accordance with the type and the progress status of the job. Processing proceeds to step S1025 if the display is necessary, and to step S1024 if the display is not necessary.

The CPU 202 generates http response information including page information requested by the request in step S1024, returns the generated http response information to the client terminal 101, which is the transmission source of the request, in step S1005, and then ends processing. On the other hand, the CPU 202 generates http response information including the job condition or the job operation screen in step S1025, returns the http response information to the client terminal 101, which is the transmission source of the request, in step S1005, and ends processing.

The above control enables, for example, favorable control of a copy operation performed by the user of the client terminal 101 from the browser, even if an erroneous browser operation has disconnected the user from an operation page between scanning of the first original and scanning of the second original. More specifically, according to the present embodiment, if the user accesses a web page of the MFP 102 again, the existence of a job in operation can be determined based on a session ID of the browser of the MFP 102, and the interrupted operation screen can be displayed. Also, in the case where the operation has already been completed, the job operation screen is not displayed, thereby preventing user operations from becoming complicated.

Furthermore, while a response appended with a session ID is always returned in response to an access without a session ID in the above-described embodiment, a session ID may be generated and appended to a response only for a specific screen and specific processing, e.g., at the time of login processing and job input. If a session ID is generated at the time of job input, the session ID is generated in the process of step S1011.

<Exclusion Control>

Figure 5:
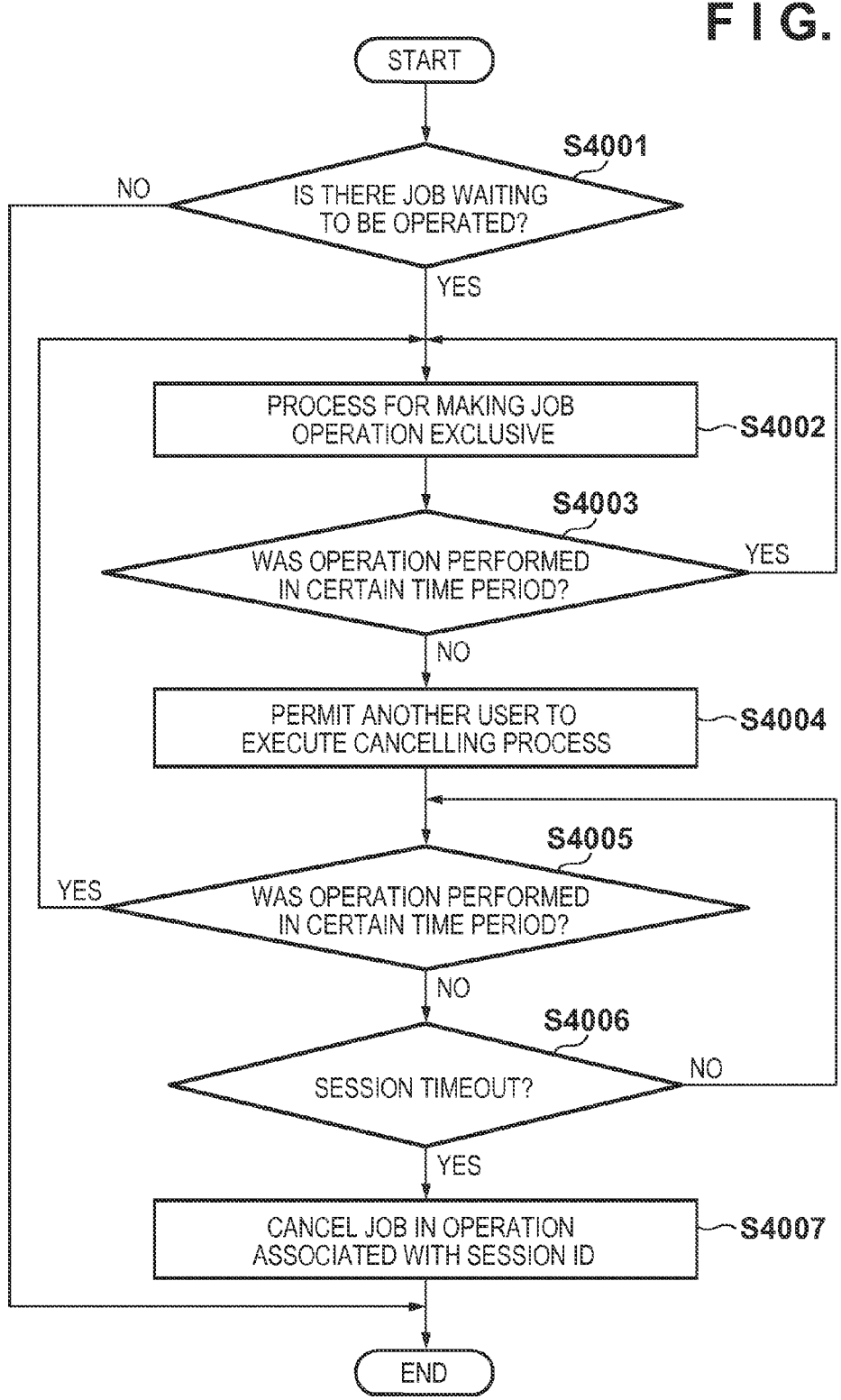
FIG. 5 is a flowchart for job operation exclusion control according to one embodiment.

With reference to FIG. 5, the following describes exclusion control related to a job that is in operation after being generated. The processing described below is realized by the CPU 202 reading a control program stored in the ROM 203 and the HDD 205 into the RAM 204 and executing the read control program.

When using a function of the MFP 102 to read a plurality of originals with the scanner and transmit the read originals by an email or copy the read originals, the user needs to perform operation multiple times between input and execution of a job. Such a job creates a job condition called an "operation wait" condition in which a user operation is waited for. If there is a job in the operation wait condition, it is preferable to perform exclusion control such that another user cannot operate the job. In the case of a job for which an execution instruction has been issued from a browser, the operation performed by another user denotes an operation from another browser, that is to say, a browser that does not have a session ID associated with the job in operation, and an operation from the operation unit 211.

First, in step S4001, the CPU 202 determines whether or not there is a job in the operation wait condition. Processing is ended if there is no job in the operation wait condition, and proceeds to step S4002 if there is a job in the operation wait condition. In step S4002, the CPU 202 makes a job operation exclusive such that another user does not operate the job. That is to say, control is performed to inhibit another user from operating the job.

Next, in step S4003, the CPU 202 determines whether or not an operation was performed in a certain time period. Processing proceeds to step S4004 if no operation was performed in the certain time period, and returns to step S4001 if an operation was performed in the certain time period. In step S4004, the CPU 202 permits another user to perform a certain operation. More specifically, it permits another user to cancel the job.

Subsequently, in step S4005, the CPU 202 further determines whether or not an operation was performed in a certain time period. Processing proceeds to step S4006 if no operation was performed, and returns to step S4002 if an operation was performed. In step S4006, the CPU 202 determines whether or not a valid period of a session ID associated with the job has elapsed (a session timeout has occurred). Processing returns to step S4005 if the session timeout has not occurred. On the other hand, if the session timeout has occurred, the CPU 202 proceeds to step S4007 and cancels the job in operation associated with the session ID. By thus performing the exclusion control, it is possible to reduce the possibility that another user operates a job without permission during operation by the original user. It is also possible to prevent a situation in which another user cannot use the MFP 102 for an extended time period due to neglect of a job in the operation wait condition.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-143094 filed on Jul. 8, 2013, which is hereby incorporated by reference herein in its entirety.

What is claimed is:

1. An image processing apparatus comprising:
a communication unit configured to accept a request from a computer over a network;
a processing unit configured to process an image processing job in response to the request; and
a control unit configured
to generate session identification information for the computer which transmitted the request corresponding to the image processing job,
to transmit, via the communication unit, to the computer a response on which the session identification information is set, to control, when the communication unit has accepted a second request on which the session identification information is set, the image processing job during processing in accordance with the accepted second request, and to inhibit, when the communication unit has accepted a third request on which the session identification information is not set, a control of the image processing job during processing in accordance with the accepted third request, generate new session identification information and transmit the generated session identification information to the computer, wherein the communication unit, the processing unit and the control unit is implemented by one or more processors.

2. The image processing apparatus according to claim 1, wherein the control unit is further configured to, when the communication unit has accepted the second request on which session identification information is set, determine whether or not an image processing job corresponding to the session identification information exists.

3. The image processing apparatus according to claim 2, wherein the processing unit is further configured to, if the control unit determines that the image processing job does not exist, process a new image processing job associated with the session identification information in response to the second request, and if the control unit determines that the image processing job exists, restart processing for the existing image processing job.

4. The image processing apparatus according to claim 3, wherein the communication unit is further configured to transmit display information to the computer when it is necessary to display a condition of the image processing job processed by the processing unit in accordance with information of the image processing job and a status of the image processing job.

5. The image processing apparatus according to claim 1, wherein the control unit is further configured to determine whether or not a job waiting to be operated exists, and to inhibit, if the control unit determines that the job waiting to be operated exists, acceptance of a request via session identification information different from identification information associated with the job.

6. The image processing apparatus according to claim 5, wherein the control unit is further configured to, when the job waiting to be operated has not been operated for a certain time period, permit acceptance of a request via session identification information different from session identification information associated with the job.

7. The image processing apparatus according to claim 6, wherein the control unit is further configured to cancel the job when the job has not been operated for a certain time period after permitting acceptance of a request via session identification information different from session identification information associated with the job.

8. The image processing apparatus according to claim 1, wherein the control unit is further configured to, when the request includes an execution request for a job, determine whether or not the job can be input, the processing unit is further configured to process the job if the control unit has determined that the job can be input, and the communication unit is further configured to transmit error information to the computer if it has been determined that the job cannot be input.

9. A method of an image processing apparatus, the method comprising:

accepting a request from a computer over a network;

processing an image processing job in response to the request;

generating session identification information for the computer which transmitted the request corresponding to the image processing job;

transmitting to the computer a response on which the session identification information is set;

controlling, when the image processing apparatus has accepted a second request on which the session identification information is set, the image processing job during processing in accordance with the accepted second request, and inhibiting, when the image processing apparatus has accepted a third request on which the session identification information is not set, a control of the image processing job during processing in accordance with the accepted third request, generating new session identification information and transmitting the generated session identification information to the computer.

10. A non-transitory computer-readable storage medium storing a computer program for causing a computer to execute a control method for an image processing apparatus, the control method comprising:

accepting a request from a computer over a network;

processing an image processing job in response to the request;

generating session identification information for the computer which transmitted the request corresponding to the image processing job;

transmitting to the computer a response on which the session identification information is set;

controlling, when the image processing apparatus has accepted a second request on which the session identification information is set, the image processing job during processing in accordance with the accepted second request, and inhibiting, when the image processing apparatus has accepted a third request on which the session identification information is not set, a control of the image processing job during processing in accordance with the accepted third request, generating new session identification information and transmitting the generated session identification information to the computer.

* * * * *